US006243202B1

(12) United States Patent
Wilhelm

(10) Patent No.: US 6,243,202 B1
(45) Date of Patent: Jun. 5, 2001

(54) STRUCTURE ARRANGEMENT, IN PARTICULAR FOR A SECURITY ELEMENT

(75) Inventor: Stork Wilhelm, Karlsruhe (DE)

(73) Assignee: Leonhard Kurz GmbH & Co., Furth (DE)

( * ) Notice: Subject to any disclaimer, the term of this patent is extended or adjusted under 35 U.S.C. 154(b) by 0 days.

(21) Appl. No.: 08/809,678

(22) PCT Filed: Sep. 8, 1995

(86) PCT No.: PCT/DE95/01229

§ 371 Date: Mar. 26, 1997

§ 102(e) Date: Mar. 26, 1997

(87) PCT Pub. No.: WO96/11114

PCT Pub. Date: Apr. 18, 1996

(30) Foreign Application Priority Data

Oct. 11, 1994 (DE) ............................................... 44 36 192

(51) Int. Cl.[7] ................................ G02B 5/18; G03H 1/00

(52) U.S. Cl. .................................. 359/567; 359/1; 359/2; 359/569; 359/566

(58) Field of Search .................................... 359/1, 2, 567, 359/569, 575; 283/86; 250/234; 356/356; 430/30

(56) References Cited

U.S. PATENT DOCUMENTS

| | | | | |
|---|---|---|---|---|
| 3,833,807 | | 9/1974 | Takeda | 250/234 |
| 4,725,511 | * | 2/1988 | Reber | 359/567 |
| 5,032,003 | * | 7/1991 | Antes | 359/567 |
| 5,058,992 | * | 10/1991 | Takahashi | 359/567 |
| 5,784,200 | * | 7/1998 | Modegi | 359/567 |

* cited by examiner

*Primary Examiner*—Audrey Chang
(74) *Attorney, Agent, or Firm*—Hoffman & Baron, LLP

(57) ABSTRACT

A structural arrangement having optical diffraction qualities for use as a security element in a value bearing document, such structural arrangement having a plurality of surface regions having at least two subregions having identical relief structures which provide for an optical diffraction effect, the relief structures of adjacent subregions being displaced relative to each other by a fraction of the grating period.

13 Claims, 2 Drawing Sheets

STRUCTURE ARRANGEMENT, IN PARTICULAR FOR A SECURITY ELEMENT

BACKGROUND OF THE INVENTION

1. Field of Invention

The invention concerns a structure arrangement comprising a plurality of surface regions having a relief structure which has an optical-diffraction effect, in particular for visually identifiable, optical security elements for value-bearing documents, for example bank notes, credit cards, passes or cheque documents, or other items to be safeguarded.

2. Description of the Prior Art

When using a structure arrangement of that kind, visually perceptible items of information can be communicated to a viewer by diffraction and/or refraction of incident ambient light. In the simplest case a structure arrangement of that kind is afforded by a rectilinear wave or corrugation structure which is provided on the surface of a surface region of a carrier element and at which incident ambient light is reflected with diffraction and/or refraction. In this respect, the term wave or corrugation structure does not necessarily denote a structure with a surface line which is steady in terms of the cross-section of the surface region and which in particular is sinusoidal, but this may also involve rectangular, step-shaped or wedge-shaped surface structures.

Diffraction of incident light or light which passes through the structure arrangement, at the relief structures of the surface regions, and therewith the information which is emitted therefrom in the form of an optical diffraction image are determined by the number of wave or grating lines per unit of length of a surface region, the so-called spatial frequency, and by the orientation and the cross-sectional shape of the relief structure which is determined inter alia by the differences in respect of height in the relief structure, more specifically both by the differences in respect of height between the individual raised portions relative to each other, and also between raised portions and troughs or depressions of the relief structure. The relief structures of the surface regions can be of such a configuration and the surface regions can be so arranged that a given item of information can be emitted in a given viewing angle range and thus perceived by a viewer, whereas, in another viewing angle range, another item of information can be perceived.

An item of visually perceptible information which corresponds to the relief structure of the surface regions and which is dependent inter alia on the lighting or viewing angle, in particular information in regard to authenticity of the safeguarded item, can be communicated to a viewer in the form of the reflected light or the light which passes through the structure.

By virtue of the use of per se known security elements with a structure arrangement having an optical-diffraction effect, in regard to the articles to be safeguarded as were referred to in the opening part of this specification, it is possible for items of authenticity information in respect of the safeguarded article to be rendered visible even to the unpractised lay person, and at the same time for forgery, for example in the form of duplication, having regard to known forgery procedures, in particular optical duplication procedures, to be rendered impossible or made sufficiently difficult.

It is known for example to provide surface regions having a respective relief structure which is determined by the above-mentioned parameters—spatial frequency, orientation and cross-sectional shape of the relief structure, and differences in respect of height in the relief structure—, the relief structure being of dimensions which can still be perceived separately from each other by the naked eye. By virtue of a suitable configuration and orientation of the respective relief structure of the surface regions, it is possible for a given item of optical information which originates from one surface region to be communicated to a viewer in dependence on the lighting direction, in a given viewing angle range, while another item of visually perceptible information originates from another surface region, in the same viewing angle range. Pivotal movement of the carrier element which carries the structure arrangement, about an axis which is in the plane of the carrier element or about an axis which extends perpendicularly to the plane of the carrier element causes a change in the information which comes from the surface region which is first viewed—in particular that surface region can appear dark—while another surface region which initially appeared dark imparts optical information, for example in the form of a colour impression. Thus, by virtue of a suitable configuration of a relief structure which is periodic at least in a portion-wise manner, it is possible for virtually the entire radiation power which impinges on a surface region from a lighting direction to be diffracted away into the first and the minus-first diffraction order so that an item of optical information coming from that surface region can be perceived only within two closely restricted viewing angle ranges—the first and the minus-first diffraction orders—while the surface region appears dark in other viewing directions.

Admittedly, in the case of structure arrangements with surface regions which can be resolved separately by the naked eye, a viewer can receive items of information which vary in dependence on the lighting and viewing angles, but the surface regions which emit those items of information are perceived separately from each other. Therefore, macroscopically separate surface regions which change and light up in a grid-like form appear to a viewer. That is found to be disadvantageous for example when a relatively large surface portion of the structure arrangement, which comprises a plurality of surface regions, is intended to communicate a homogenous image impression and if therefore that surface portion is to appear in a first viewing angle range in a colour shade which is uniform over the extent of the surface portion, whereas a different image impression which is homogenous over the extent of the surface portion is intended to be perceptible in another viewing angle range.

Structure arrangements with surface regions each having a given relief structure, which can be resolved separately with the naked eye, can also have a disadvantageous effect by virtue of the fact that the magnitude of their diffraction orders, that is to say the viewing angle range which is associated with a diffraction order, is very small, and therefore a given item of information is visible only within a very small viewing angle range. That may be undesirable in individual cases.

Admittedly, it has been proposed in EP 0 330 738 B1 that the size of the surface regions is reduced, more specifically to a largest dimension of less than 0.3 mm. EP 0 375 833 B1 also discloses, in the structure arrangement, the provision of grid pattern areas which have a largest dimension of less than 0.3 mm and which include a plurality of area portions each having a mutually different grating structure. Admittedly, with structure arrangements of that kind, a relatively large surface portion can provide for the communication in a highly homogenous manner of various items of visually perceptible information, in dependence on the viewing angle; for that purpose however it is necessary to provide different relief structures within very small surface regions.

OBJECTS OF THE INVENTION

The object of the present invention is to provide a structure arrangement of the kind set forth in the opening part of this specification, which satisfies the above-indicated requirements, without relief structures that differ from each other having to be provided within a surface region with a dimension of less than 0.3 mm.

In accordance with the invention, in a structure arrangement of the kind described in the opening part of this specification, that object is attained in that there are provided surface regions which have at least two sub-regions with identical relief structures which are displaced relative to each other by a fraction of the grating period. The relief structures are the same in regard to the above-mentioned parameters—spatial frequency, cross-sectional shape and orientation of the relief structure, and differences in respect of height in the relief structure. In this case, the displacement of the relief structures can be achieved by moving the relief structures in the plane of the surface region or the sub-regions. It is however also possible for the relief structures of the sub-regions to be displaced relative to each other perpendicularly to the plane of a surface region being viewed, so that the surfaces of the sub-regions are therefore at different "heights". By virtue of the fact that the relief structure of one sub-region is displaced relative to the identical relief structure of another sub-region, the brightness of a surface region, which can be perceived by a viewer, is modulated in accordance with the relationship of displacement $\delta x$ to the grating period g. If we consider a surface region with only two sub-regions which are of the same size and whose smallest dimensions can no longer be resolved with the naked eye, both sub-regions contribute to the brightness of the surface region being considered. Addition of the wave fields which are emitted by the sub-regions occurs in the eye of a viewer; that addition can be mathematically described as quantitative squaring of the amplitudes which are diffracted at the sub-regions, with the relative value 1 or $\mathrm{Exp}(i\phi)$, wherein the phase $\phi$ is given by $2\pi\,\delta x/g$. The intensity is therefore as follows:

$$I=(1+\mathrm{Exp}(i\phi))\cdot(1+\mathrm{Exp}(-i\phi))=2+2\cos\phi.$$

Therefore, the brightness of a surface region can be adjusted by way of the relative displacement or shift of the relief structure of a sub-region relative to the relief structure of another sub-region. It is therefore possible for the brightness to be varied within a surface region which can be resolved with the naked eye, with only one single relief structure which is characterised by the above-mentioned parameters, more specifically by dividing that surface region into sub-regions with the same relief structure which however are displaced relative to each other. In the case of known structure arrangements, this was possible only by virtue of the fact that different relief structures were provided within a surface region, those relief structures having largest dimensions of less than for example 0.3 mm in order to produce a homogenous image impression.

It has been found particularly advantageous if groups of sub-regions with identical relief structure involving the same respective phase position are provided within a surface region. The expression "phase position" can be most easily defined by the example of a linearly extended relief structure. Such relief structures have the same phase position, in the above-indicated sense, if their linearly extended raised portions are aligned with each other. They involve different phase positions if the raised portions are admittedly parallel but displaced by a fraction of the grating period.

SUMMARY OF THE INVENTION

In a preferred structure arrangement, sub-regions belonging to a group are arranged alternately with sub-regions belonging to another group. The diffraction orders of the (undisplaced) relief structure are divided up by virtue of the displacement of the relief structure of sub-regions of a group relative to the identical relief structure of sub-regions of another group. The structure arrangement therefore functions as a beam splitter which overlies the (undisplaced) relief structure. That is to say, no intensity or a lower level of intensity can be perceived in the viewing angle range of the (undisplaced) relief structure, said range corresponding to the first or the minus-first diffraction order. By virtue of a variation in the phase between zero and $\pi$ however the perceptible relative intensity can be varied as between the original viewing angle range and the viewing angle ranges which are produced by the phase shift.

The surface regions and sub-regions are preferably of a strip-like configuration, wherein the surface regions preferably have a largest dimension of more than 0.3 mm and the sub-regions have a smallest dimension of less than 0.3 mm. In that way, a plurality of sub-regions which can no longer be resolved at least in the direction of a smallest dimension can be provided within a surface region which can be resolved with the naked eye. In particularly preferred structure arrangements the sub-regions have a smallest dimension of less than 0.1 mm.

In a further development of the invention, it is provided that the sub-regions are designed with different dimensions. This affords the possibility of controlling the brightness of a surface region not only by phase shift or displacement, that is to say the displacement within the relief structure, but also by virtue of the size of the sub-regions. Thus for example an elongate sub-region of a strip-like configuration can be of varying widths along its longitudinal direction. In the case of a structure arrangement with a phase shift of $\pi$, that is to say with a displacement of the relief structures of the respective sub-regions by half the grating period, the intensity of the surface region being considered can be varied between zero and 1 by way of the relationship of the surface-area proportions of the respective sub-regions involving the same phase.

It will be appreciated that the configuration of a structure arrangement according to the invention is not restricted to rectilinear relief structures, but that any curved relief structures can be arranged in the described manner. It is also possible, and can also be found advantageous having regard to the desired image brightness, if curved grating structures are of a polygon-like configuration, that is to say they are represented by rectilinear grating lines which adjoin each other. In this case the impinging light is diffracted only into a discrete number of directions in which however the perceptible intensity is greater than in the case of steadily curved grating lines.

It has further been found advantageous if grating lines of mutually displaced relief structures of mutually adjoining sub-regions merge steadily one into the other.

BRIEF DESCRIPTION OF THE DRAWINGS

Further features, details and advantages of the invention are apparent from the accompanying drawing and from the following description of some advantageous embodiments of the structure arrangement according to the invention.

In the drawing.

DETAILED DESCRIPTION OF THE DRAWINGS

Figure 1:
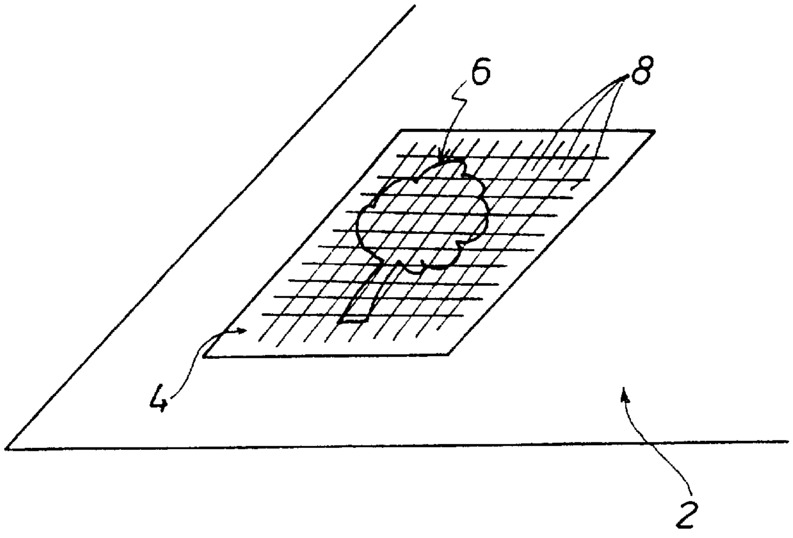
FIG. 1 shows a security element of a value-bearing document which is composed of a plurality of diagrammatically indicated surface regions.

FIG. 1 shows a value-bearing document carrier 2 with a security element 4. The security element 4 includes a structure arrangement in which an item of visually perceptible information is stored, in the form of an image 6. The security element 4 or the structure arrangement includes a multiplicity of diagrammatically indicated surface regions 8 which have a relief structure which cannot be shown in FIG. 1.

Figure 2:
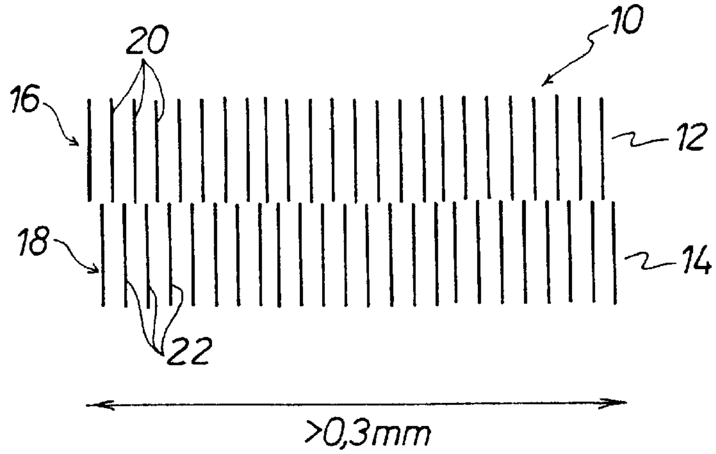
FIG. 2 shows a surface region of a structure arrangement according to the invention.

FIG. 2 shows a surface region 10 of a structure arrangement designed in accordance with the invention. The surface region 10 has a largest dimension, which can be resolved with the naked eye, of more than 0.3 mm, and comprises two sub-regions 12, 14 with identical relief structures 16 and 18 respectively. Accordingly, the relief structures 16, 18 involve the same spatial frequency and are the same in terms of the cross-sectional shape and the orientation of the grating lines. The relief structure 16, 18 is indicated in FIG. 2 by perpendicular lines 20, 22 which are intended to represent the grating lines, that is to say the raised portions of the relief structure, the spacing between the grating lines not being shown true to scale. The relief structure 16 of the sub-region 12 is arranged displaced relative to the relief structure 18 of the sub-region 14 by a fraction of the grating period g. If the relief structure 16, 18 for example involves a symmetrical grating, then, with the grating being of a given cross-sectional shape, light impinging perpendicularly onto the relief structure is diffracted away half towards the left and half towards the right, and can be perceived in the first and the minus-first diffraction orders (possibly in higher diffraction orders). The diffraction orders can be divided up, by virtue of the above-described displacement of the relief structure 16 of the sub-region 12 relative to the relief structure 18 of the sub-region 14, by half the grating period g. The structure arrangement thus acts as a beam splitter. Light which is incident perpendicularly onto the structure arrangement can no longer be perceived in the viewing angle range associated with the first and the minus-first diffraction order of the undisplaced grating. More specifically, the first and minus-first diffraction orders are in turn divided up, more specifically perpendicularly to the original dispersion direction. Thus, with a phase shift of $\pi$ ($\delta x=g/2$), the first and the minus-first diffraction orders result in four viewing angle ranges in which the item of information originating from the surface region 10 can be perceived.

Figure 3:
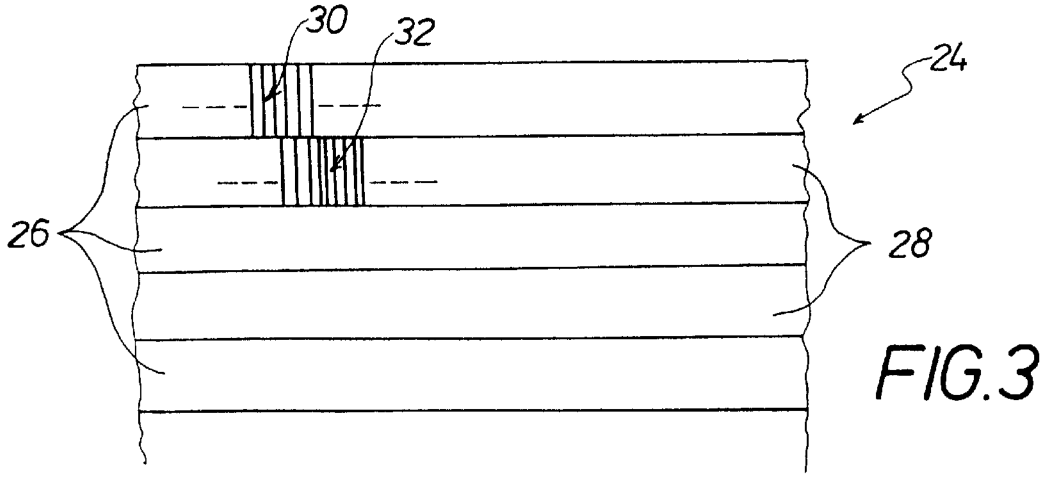
FIG. 3 shows a surface region of a structure arrangement according to the invention comprising two groups of sub-regions.

A surface region 24 as shown in FIG. 3 comprises two groups of sub-regions 26 and 28 respectively with identical relief structures 30, 32 involving the same phase position within a group. As described with reference to FIG. 2, the relief structures 30, 32 of the sub-regions 26, 28 are displaced relative to each other.

The greater the number of sub-regions 26, 28 arranged alternately in a vertical direction in FIG. 3, that is to say the larger the surface region 24 is, the more restricted are the viewing angle ranges in which it is possible to perceive an item of information coming from the surface region 24. The smaller the width of the strip-like sub-regions 26, 28 or the greater the number of sub-regions of the described kind arranged alternately on the surface region 24, the correspondingly greater is the degree to which the diffraction orders are divided up.

Figure 4:
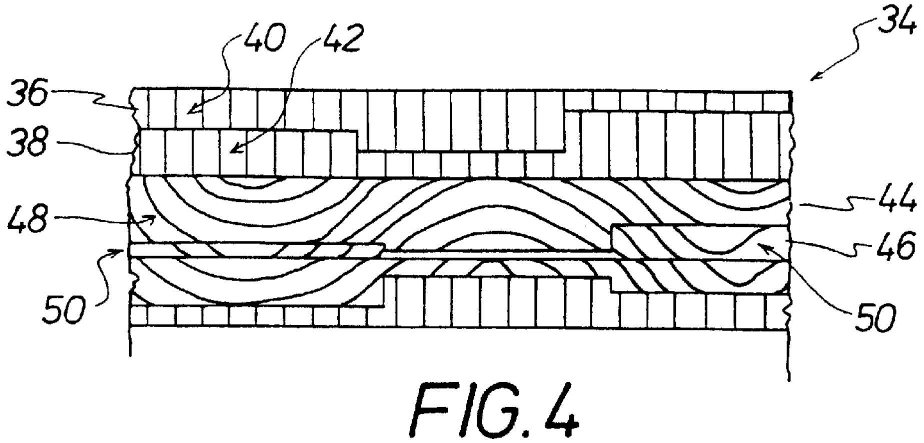
FIG. 4 shows a surface region of a structure arrangement according to the invention with sub-regions of varying dimensions.

FIG. 4 shows a surface region 34 of a further embodiment of the structure arrangement according to the invention. This surface region 34 includes sub-regions 36, 38 with identical and mutually displaced relief structures 40 and 42 respectively. The sub-regions 36 and 38 are of different dimensions and are of a width which varies along their longitudinal extent. If the relief structure 40 is displaced relative to the relief structure 42 by half the grating period g, and therefore the relief structures involve the phase shift $\pi$, then the relative brightness of the surface region 34 which can be resolved with the naked eye can be varied by the surface-area proportion of the sub-regions 36, 38. A portion of the surface region 34, in which the sub-regions 36, 38 are of the same surface-area proportions, therefore appears dark, while another portion of the surface region 34, in which the size of the sub-region 36 predominates over the size of the sub-region 38 (at the left in FIG. 4), appears light.

The surface region 34 includes further sub-regions 44, 46 with identical relief structures 48 and 50 respectively. In that case, the relief structures 48 and 50 include curved grating lines to achieve appropriate optical effects; the curved grating lines can possibly be replaced or approximated by correspondingly polygonally extending lines. The relief structure 48 is phase-shifted relative to the relief structure 50 in the above-described manner.

Figure 5:
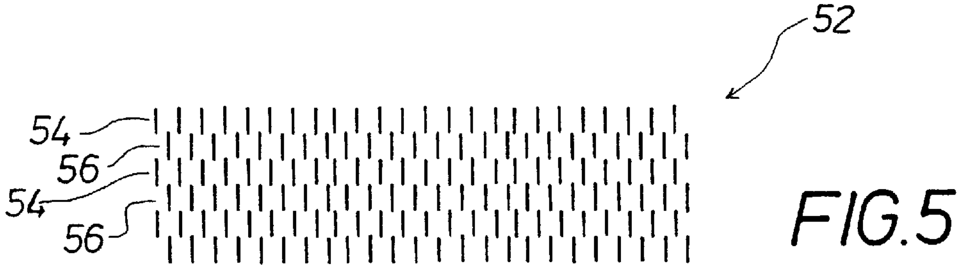
FIG. 5 shows a surface region of a structure arrangement according to the invention comprising groups of sub-regions with a very small smallest dimension.

FIG. 5 shows a surface region 52 having two groups of sub-regions 54 and 56 respectively. The sub-regions 54, 56 involve a longitudinal extent of more than 0.3 mm and a transverse extent of 0.05 mm. With such a structure arrangement, it is possible to produce a large splitting effect for the diffraction orders.

Figure 6:
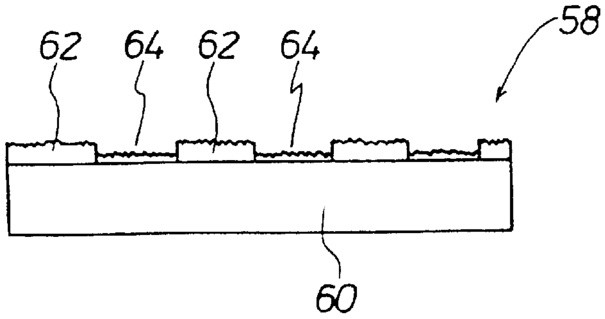
FIG. 6 is a view in section through a surface region of a structure arrangement according to the invention with a relief structure which is displaced perpendicularly to the surface of the surface region.

Finally FIG. 6 is a view in section through a structure arrangement or a surface region 58 on a carrier element 60. The surface region 58 includes sub-regions 62 and 64 with relief structures which are identical but which are displaced in a direction substantially perpendicularly to the plane of the carrier, by a fraction of the grating period. The relief structure is illustrated only by way of indication and the magnitude of the displacement in respect of height is shown in greatly exaggerated manner.

What is claimed:

1. A structural arrangement having a relief structure providing an optical-diffraction effect for use as a visually identifiable, optical security element for value bearing documents comprising:

a plurality of surface regions, wherein at least one of said surface regions comprises a first group of subregions wherein at least two subregions adjacent each other have identical relief structures with respect to spatial frequency, cross-sectional shape, orientation and height, said spatial frequency and orientation defining a grating structure comprised of grating lines having a grating period defined by said spatial frequency and wherein said at least two subregions adjacent each other are displaced relative to each other by a fraction of said grating period.

2. The structural arrangement in accordance with claim 1 wherein within at least one of said surface regions, there are at least two groups of subregions, each of said subregions of the same group having identical relief structure.

3. The structural arrangement in accordance with claim 1 wherein each of said surface regions have a dimension greater than 0.3 mm.

4. The structural arrangement in accordance with claim 1 wherein at least one of said subregions is of strip-like configuration.

5. The structural arrangement in accordance with claim 1 wherein at least one of the said subregions has a smallest dimensions of less than 0.1 mm.

6. The structural arrangement in accordance with claim 1 wherein said at least one of said surface regions further comprises a second group of subregions having dimensions that are different from said first group of subregions.

7. The structural arrangement in accordance with claim 1 wherein at least one of said subregions has a strip-like configuration varying in width along the extent of said striplike configuration.

8. The structural arrangement in accordance with claim 1 wherein said relief structure of one of said subregions is displaced relative to said relief structure of said adjacent subregion by one half said grating period and wherein within at least one of said surface regions, there are at least two groups of subregions, each of said subregions of the same group having identical relief structure.

9. The structural arrangement in accordance with claim 1 wherein said grating lines of said mutually adjoining subregions are arranged to merge into each other.

10. A structural arrangement having a relief structure providing an optical-diffraction effect for use as a visually identifiable, optical security element for value bearing documents comprising:

a plurality of surface regions, wherein at least one of said surface regions comprises a first group of subregions wherein at least two subregions adjacent each other have identical relief structures with respect to spatial frequency, cross-sectional shape, orientation and height, said spatial frequency and orientation defining a grating structure comprised of grating lines having a grating period defined by said spatial frequency and wherein said at least two subregions adjacent each other are displaced relative to each other by one half said grating period.

11. The structural arrangement in accordance with claim 10 wherein each of said surface regions have a dimension greater than 0.3 mm.

12. The structural arrangement in accordance with claim 10 wherein at least one of said subregions is of strip-like configuration.

13. The structural arrangement in accordance with claim 10 wherein at least one of the said subregions has a smallest dimensions of less than 0.1 mm.

* * * * *